(12) United States Patent
Abe et al.

(10) Patent No.: US 11,497,232 B2
(45) Date of Patent: Nov. 15, 2022

(54) METHOD FOR PRODUCING FRIED NOODLES

(71) Applicant: NISSIN FOODS HOLDINGS CO., LTD., Osaka (JP)

(72) Inventors: Hideaki Abe, Osaka (JP); Toshio Yoshinuma, Osaka (JP)

(73) Assignee: NISSIN FOODS HOLDINGS CO., LTD., Osaka (JP)

( * ) Notice: Subject to any disclaimer, the term of this patent is extended or adjusted under 35 U.S.C. 154(b) by 82 days.

(21) Appl. No.: 16/328,637

(22) PCT Filed: Aug. 29, 2017

(86) PCT No.: PCT/JP2017/030839
§ 371 (c)(1),
(2) Date: Feb. 26, 2019

(87) PCT Pub. No.: WO2018/043449
PCT Pub. Date: Mar. 8, 2018

(65) Prior Publication Data
US 2020/0093161 A1    Mar. 26, 2020

(30) Foreign Application Priority Data
Aug. 31, 2016    (JP) .............................. JP2016-170389

(51) Int. Cl.
*A23L 7/113*    (2016.01)

(52) U.S. Cl.
CPC ..................................... *A23L 7/113* (2016.08)

(58) Field of Classification Search
CPC ....................................................... A23L 7/113
See application file for complete search history.

(56) References Cited

U.S. PATENT DOCUMENTS

| | | | |
|---|---|---|---|
| 4,098,906 A | 7/1978 | Hisaki et al. | |
| 4,840,808 A * | 6/1989 | Lee | A23L 19/09 426/270 |
| 4,963,387 A | 10/1990 | Nakagawa et al. | |
| 6,497,910 B2 * | 12/2002 | Takahashi | A23P 20/12 426/302 |
| 2009/0047396 A1 * | 2/2009 | Ikeda | A23L 27/40 426/271 |
| 2010/0323070 A1 | 12/2010 | Seto et al. | |
| 2011/0129582 A1 | 6/2011 | Miyazaki et al. | |
| 2011/0229613 A1 | 9/2011 | Takizawa et al. | |
| 2012/0034368 A1 | 2/2012 | Okazaki et al. | |
| 2013/0251875 A1 | 9/2013 | Minamitani et al. | |
| 2016/0249652 A1 | 9/2016 | Tanaka et al. | |
| 2017/0156363 A1 * | 6/2017 | Munafo | A23G 1/32 |

FOREIGN PATENT DOCUMENTS

| | | |
|---|---|---|
| CN | 1409991 | 4/2003 |
| CN | 1709142 | 12/2005 |
| CN | 101686717 | 3/2010 |
| CN | 101933570 | 1/2011 |
| CN | 103153091 | 6/2013 |
| CN | 103260432 | 8/2013 |
| CN | 103315226 | 9/2013 |
| CN | 105636454 | 6/2016 |
| EP | 0666035 | 8/1995 |
| JP | 64-027447 | 1/1989 |
| JP | 6-000064 | 1/1994 |
| JP | 6-113802 | 4/1994 |
| JP | 2000-175638 | 6/2000 |
| JP | 2002-027930 | 1/2002 |
| JP | 2004-242571 | 9/2004 |
| JP | 2008-054661 | 3/2008 |
| JP | 4644298 B | 3/2011 |
| JP | 4761534 B | 8/2011 |
| JP | 2012-060999 | 3/2012 |
| JP | 2015-057979 | 3/2015 |
| JP | 2015-084772 | 5/2015 |
| JP | 2015-213434 | 12/2015 |
| WO | 2011/013185 | 2/2011 |

OTHER PUBLICATIONS

The extended European Search Report issued for European patent application No. 17846454.1, dated Mar. 17, 2020, 5 pages.
New Food Industry, 2015, vol. 57, No. 12, pp. 11-16, ISSN: 0547-0277, particularly introduction, pp. 13, 14, table 2 (Kojima, About New Food Additive "Postassium Lactate")—cited in the English translation of the International Search Report.
International Search Report (PCT/ISA/210) issued in International Application No. PCT/JP2017/030839, dated Nov. 28, 2017, 5 pages with translation.
Written Opinion of the International Searching Authority (PCT/ISA/237) issued in International Application No. PCT/JP2017/030839, dated Nov. 28, 2017, 5 pages.
Office Action issued in Japanese Patent Application No. 2016-170389, dated Apr. 24, 2018, 5 pages with translation.
Decision to Grant issued in Japanese Patent Application No. 2016-170389, dated Jun. 5, 2018, 7 pages with translation.
International Search Report (PCT/ISA/210) issued in International Application No. PCT/JP2017/030838, dated Nov. 28, 2017, 5 pages with translation.
Written Opinion of the International Searching Authority (PCT/ISA/237) issued in International Application No. PCT/JP2017/030838, dated Nov. 28, 2017, 12 pages with translation.

(Continued)

*Primary Examiner* — Katherine D Leblanc

(74) *Attorney, Agent, or Firm* — Hamre, Schumann, Mueller & Larson, P.C.

(57) ABSTRACT

[Problem to be Solved] The present invention provides a method for producing fried noodles having a reduced sodium content and excellent noodle making properties, texture, and flavor.

[Solution] Fresh noodles having excellent noodle making properties, texture, and flavor can be produced not by adding salt but by adding 1 to 3% by weight of potassium lactate relative to a main raw material powder such as wheat flour. Further, fried noodles having a reduced sodium content and excellent texture and flavor can be produced by steaming the fresh noodles and fry drying.

4 Claims, No Drawings

(56) References Cited

OTHER PUBLICATIONS

Decision to Grant issued in Japanese Patent Application No. 2016-170387, dated Apr. 17, 2018, 7 pages with translation.
Office Action issued for Chinese Patent Application No. 201780034658.6, dated Aug. 4, 2021, 10 pages including English translation.
Office Action issued for Brazilian Patent Application No. BR112019003966-0, dated Nov. 29, 2021 (Published Dec. 7, 2021), 7 pages including English translation.
Office Action issued for Brazilian Patent Application No. BR112019003977-5 , dated Nov. 29, 2021, 8 pages including English translation.
U.S. Appl. No. 16/328,613, filed Feb. 26, 2019.
Office Action issued for Chinese Patent Application No. 201780034708.0, dated Jul. 30, 2021, 10 pages including English translation.

* cited by examiner

METHOD FOR PRODUCING FRIED NOODLES

TECHNICAL FIELD

The present invention relates to a method for producing fried noodles having a reduced sodium content.

BACKGROUND ART

In recent years, many products having a reduced sodium content which is so-called reduced salt products have been launched for preventing hypertension. According to "Dietary Reference Intakes for Japanese (2010)" published by the Ministry of Health, Labour and Welfare, a target value of a salt intake per day was less than 9 g for an adult male and less than 7.5 g for an adult female. However, according to "Dietary Reference Intakes for Japanese (2015)", the target value of a salt intake per day for an adult male and an adult female was reduced to less than 8 g and less than 7 g, respectively. For that reason, intention to reduce salt intake is expected to grow even more from now on.

A technique for reducing a salt content in noodles is disclosed, for example, in Patent Literatures 1 to 4.

Patent Literature 1 describes udon noodles containing wheat flour, a thickener composition, and water, in which the thickener composition contains xanthan gum, locust bean gum, and guar gum as a thickener composition for udon noodles containing wheat flour, a thickener composition, and water, as a technique relating to udon noodles having sufficient elasticity produced by adding a smaller amount of salt than that of conventional udon noodles.

Patent Literature 2 describes a technique for noodle making by mixing arginine or arginine salt into wheat flour, as a technique for producing salt-free or low salt Chinese noodles.

Patent Literature 3 describes noodles containing either one of or both isomaltulose and reduced isomaltulose and a method for producing the same, as noodles having a reduced or no content of sodium salt, especially salt and sodium carbonate, and a method for producing such noodles.

Patent Literature 4 describes a method for producing noodles using magnesium chloride contained in bittern, as a technique for producing salt-free noodles produced without adding salt.

CITATION LIST

Patent Literature

Patent Literature 1: Japanese Patent Laid-Open No. 2015-84772
Patent Literature 2: Japanese Patent Laid-Open No. 2015-213434
Patent Literature 3: Japanese Patent Publication No. 4644298
Patent Literature 4: Japanese Patent Publication No. 4761534

SUMMARY OF INVENTION

Technical Problem

The present invention provides a method for producing fried noodles having a reduced sodium content and excellent noodle making properties, texture, and flavor.

Solution to Problem

The present inventors conducted a study on a technique for noodle making without adding salt for a purpose of reducing a salt content, and consequently found out that noodles can be made similarly to conventional noodles by adding potassium lactate and such noodles also have flavor and texture equivalent to those of the conventional noodles made by adding salt. The present invention was completed based on the above findings.

That is, the present invention is a method for producing fried noodles including the steps of kneading a main raw material powder, water, and 1 to 3% by weight of at least potassium lactate as a sub material relative to a total weight of the main raw material powder to prepare dough, preparing noodle strings from the prepared dough, steaming the prepared noodle strings to gelatinize the noodle strings, and fry drying the gelatinized noodle strings.

Advantageous Effects of Invention

The present invention can provide a method for producing fried noodles having a reduced sodium content and excellent noodle making properties, texture, and flavor.

DESCRIPTION OF EMBODIMENTS

Hereinafter, the present invention will be described in detail. However, the present invention is not limited to the following description.

1. Raw Material Formulation

Examples of a main raw material powder used for producing fried noodles according to the present invention include grain flour such as wheat flour (including durum wheat flour), buckwheat flour, barley flour, and rice flour, and various starches such as potato starch, tapioca starch and cornstarch, and these may be used singly or in combination. As the starches, raw starch, gelatinized starch, and processed starches such as acetylated starch, etherified starch, and cross-linked starch can also be used.

In the present invention, 1 to 3% by weight of potassium lactate is added as a sub material relative to a total weight of those main raw material powders described above. With potassium lactate being added, fried noodles having sufficient noodle making properties and satisfactory texture can be produced without adding salt. A method for adding potassium lactate is not limited to a particular method, and potassium lactate is preferably added in a form of kneading water in which potassium lactate is dissolved. When potassium lactate is less than 1% by weight, dough lacks extensibility and viscoelasticity if salt is not added, and thus it is difficult to obtain sufficient noodle making properties and elastic texture. On the other hand, adding more than 3% by weight of potassium lactate not only has an influence on flavor of noodles but also enhances a water absorption property which makes noodles soft when cooked. An amount of potassium lactate added is preferably 1.0 to 2.0% by weight, further preferably 1.5 to 2.0% by weight, relative to a total weight of a main raw material powder.

As other sub materials, salt, an alkaline agent, phosphates, various thickeners, a noodle quality modifier, an edible fat or oil, a pH adjuster, various coloring agents such as carotene pigments, a preservative, and the like, which are generally used for producing fried noodles, can be added in the present invention. These may be added together with the main raw material powder or may be added in a form of kneading water in which these materials are dissolved or suspended.

When an alkaline agent such as carbonate or a phosphate is added, a sodium content thereof is small even if a sodium salt is added, and thus adding these sub materials has not much effect on a reduction of a salt content. However, it is preferable that potassium salt or the like be used and avoid using a sodium salt as far as possible.

2. Kneading Step

Noodle dough (dough) according to the present invention may be prepared in accordance with an ordinary method. That is, a noodle material powder and kneading water may be kneaded so that they are uniformly mixed with each other with a batch mixer, a flow jet mixer, a vacuum mixer, or the like to prepare crumbly dough.

3. Noodle Making Step

Next, noodle strings are prepared from the prepared dough. The noodle strings may be prepared in accordance with an ordinary method in which the dough is rolled into a crude noodle belt, which is compounded or the like to produce a noodle belt, the noodle belt is further rolled out a plurality of times to produce a noodle belt having a predetermined thickness, and then the noodle belt is cut with a cutting-out roll called a cutting blade to prepare the noodle strings.

4. Steaming Step

Raw noodle strings prepared in the noodle making step are steamed in accordance with an ordinary method to gelatinize the noodle strings. A preferable steaming condition varies depending on types of noodles and thicknesses of noodles, and thus the condition may be appropriately set at a preferable condition to achieve target texture. Examples of the steaming method include not only heating with boiling or saturated water vapor but also heating with superheated steam, and a moisture supplying step such as showering and dipping can be combined with the steaming method. The cooked noodles can be dipped into a seasoning liquid, or a loosening agent can be added to the cooked noodles, as necessary.

5. Drying Step

The noodle strings are cut into single meal amount, which is weighed and filled into a container, which is called a retainer, for fry drying, for fry drying. The drying is preferably performed at a drying temperature of 140 to 160° C. The noodle strings may be dried so that a moisture of the noodle strings after drying is reduced to 1.5 to 5% by weight.

As described above, a main raw material powder, water, and 1 to 3% by weight of at least potassium lactate as a sub material relative to a total weight of the main raw material powder are kneaded to prepare dough, noodle strings are prepared from the prepared dough, and the noodle strings are steamed and then fry dried to produce fried noodles. Accordingly, the method for producing fried noodles having a reduced sodium content, and excellent noodle making properties, texture, and flavor can be provided.

EXAMPLES

Hereinafter, the present embodiment is described in more detail with reference to Examples below.

Example 1

To a powder mixture in which a main raw material powder containing 900 g of wheat flour and 100 g of tapioca acetylated starch was mixed with 5 g of calcium carbonate as a sub material, kneading water obtained by dissolving 19.2 g of a 78% aqueous potassium lactate solution (containing 15 g of potassium lactate), 1 g of potassium carbonate, 1 g of sodium carbonate, and 1 g of sodium metaphosphate in 350 g of water was added, and the resultant was mixed for 15 minutes with a normal pressure mixer to prepare noodle dough (dough).

The prepared dough was rolled into a crude noodle belt, which was compounded to prepare a noodle belt. The prepared noodle belt was rolled out with a roll so that the noodle belt eventually had a thickness of 0.75 mm, and the resultant noodle belt was then cut with a cutting blade roll having a #20 square blade to prepare noodle strings.

Next, the noodle strings were steamed for 2 minutes in a steam chamber into which saturated water vapor was supplied at 250 kg/h to gelatinize the noodle strings.

The gelatinized noodle strings were dipped into a seasoning liquid obtained by dissolving 10 g of salt and 4 g of monosodium glutamate in water and diluting the resultant up to 1 L, cut into about 30 cm, then filled into a retainer (container) for fry drying by 105 g per single meal, and dried for 2 minutes and 30 seconds at 150° C. to produce sample fried noodles having a moisture of 2% by weight. A noodle weight at this time was 60 g.

Example 2

Sample fried noodles were prepared in accordance with Example 1 except that the aqueous potassium lactate solution was added in an amount of 12.8 g (10 g as potassium lactate).

Example 3

Sample fried noodles were prepared in accordance with Example 1 except that the aqueous potassium lactate solution was added in an amount of 25.6 g (20 g as potassium lactate).

Example 4

Sample fried noodles were prepared in accordance with Example 1 except that the aqueous potassium lactate solution was added in an amount of 38.4 g (30 g as potassium lactate).

Comparative Example 1

Sample fried noodles were produced in accordance with Example 1 except that the noodle dough (dough) was prepared in the following manner: to a powder mixture in which a main raw material powder containing 900 g of wheat flour and 100 g of tapioca acetylated starch was mixed with 5 g of calcium carbonate as a sub material, kneading water obtained by dissolving 15 g of salt, 1 g of potassium carbonate, 1 g of sodium carbonate, and 1 g of sodium metaphosphate in 350 g of water was added, and the resultant was mixed for 15 minutes with a normal pressure mixer.

Comparative Example 2

Sample fried noodles were prepared in accordance with Example 1 except that the aqueous potassium lactate solution was added in an amount of 6.4 g (containing 5 g of potassium lactate).

Comparative Example 3

Sample fried noodles were prepared in accordance with Example 1 except that the aqueous potassium lactate solution was added in an amount of 44.8 g (containing 35 g of potassium lactate).

Noodle making properties of noodles and texture and flavor of cooked noodles in each experimental section were evaluated using Comparative Example 1 as a standard. As for the noodle making properties of noodles, noodles having excellent noodle making properties equivalent to that of Comparative Example 1 were evaluated as Excellent, noodles having good noodle making properties on the whole were evaluated as Good, noodles that have poor noodle making properties but were able to be made by machinery were evaluated as Average, and noodles that lack noodle making properties and were unable to be made by machinery were evaluated as Poor.

As for a cooking method, sample noodles and powdered soup were put in a cup-type foamed paper cup container, and 380 ml of boiling water was poured therein to cook the noodles for 3 minutes with a lid on, which was then eaten to evaluate the texture and flavor. The evaluation was made by 5 experienced panelists. As for the texture, noodles having suitable elasticity and excellent texture equivalent to those of Comparative Example 1 were evaluated as Excellent, noodles being slightly hard or soft but having good texture on the whole were evaluated as Good, noodles being relatively hard or soft and having poor texture were evaluated as Average, and noodles being too hard or soft and having significantly poor texture were evaluated as Poor. As for the flavor, noodles having excellent flavor equivalent to that of Comparative Example 1 were evaluated as Excellent, noodles having good flavor on the whole were evaluated as Good, noodles having a harsh taste and poor flavor were evaluated as Average, and noodles having a strong harsh taste and significantly poor flavor were evaluated as Poor.

The noodle making properties and sensory evaluation results for each experimental section of Experiment 1 are shown in Table 1 below.

TABLE 1

| Experimental section | Potassium lactate | Noodle making properties | Texture | Flavor | Comments |
|---|---|---|---|---|---|
| Example 1 | 1.5% by weight | Excellent | Excellent | Excellent | Noodle making properties, texture, and flavor were equivalent to those of Comparative Example 1. |
| Example 2 | 1.0% by weight | Excellent/Good | Excellent/Good | Excellent | Dough had slightly poor extensibility as compared to that of Comparative Example 1, but noodle making properties were good on the whole. Texture was slightly hard as compared to that of Comparative Example 1, but it was good on the whole. Flavor was equivalent to that of Comparative Example 1. |
| Example 3 | 2.0% by weight | Excellent | Excellent | Excellent | Noodle making properties, texture, and flavor were equivalent to those of Comparative Example 1. |
| Example 4 | 3.0% by weight | Good | Good | Good | Slight stickiness was shown as noodle making properties, but noodle making properties were good on the whole. Texture was slightly soft and flavor of a slightly harsh taste was sensed, but the texture and the flavor were good on the whole. |
| Comparative Example 1 | 0.0% by weight | Excellent | Excellent | Excellent | Standard |
| Comparative Example 2 | 0.5% by weight | Average | Average | Good | Noodles were able to be made, but dough had poor extensibility and was dry and rough on the surface. Texture was hard and rough on the surface. Noodles had a reduced harsh taste but lacked a salty taste. |
| Comparative Example 3 | 3.5% by weight | Average | Average | Average | Strong stickiness was shown as noodle making properties, and noodles were in a borderline level of whether it is possible to make noodles or not. Texture was soft and flavor of a harsh taste was sensed. |

The invention claimed is:

1. A method for producing fried noodles, comprising:
   kneading a main raw material powder, water, and a sub material so as to prepare dough;
   preparing noodle strings from the prepared dough;
   steaming the prepared noodle strings so as to gelatinize the noodle strings; and
   fry drying the gelatinized noodle strings,
   wherein the dough consists of: the main raw material powder; water; and the sub material,
   the sub material consists of: potassium lactate; and at least one material selected from the group consisting of an alkaline agent, phosphates, thickeners, a noodle quality modifier, an edible fat or oil, a pH adjuster, coloring agents, and a preservative, and
   an amount of potassium lactate in the dough is in a range from 1 to 3% by weight relative to a total weight of the main raw material powder, wherein the sub material does not include common salt.

2. The method for producing fried noodles according to claim 1,
   wherein in the fry drying of the gelatinized noodle strings, the fry drying is performed at a drying temperature in a range from 140 to 160° C. so that a moisture of the noodle strings after drying is reduced to in a range from 1.5 to 5% by weight.

3. The method for producing fried noodles according to claim 1,
   wherein the amount of potassium lactate in the dough is in a range from 1.5 to 3.0% by weight relative to the total weight of the main raw material powder.

4. The method for producing fried noodles according to claim 1,
   wherein the amount of potassium lactate in the dough is in a range from 1.5 to 2.0% by weight relative to the total weight of the main raw material powder.

\* \* \* \* \*